E. G. THOMAS
TESTING DEVICE
April 12, 1932.
Re. 18,421
Original Filed April 28, 1921 2 Sheets-Sheet 1
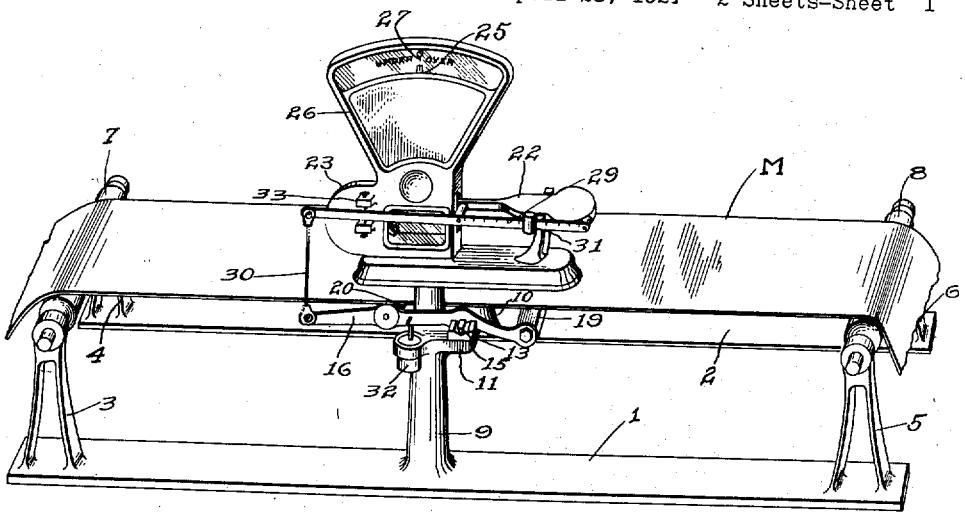
FIG. I.
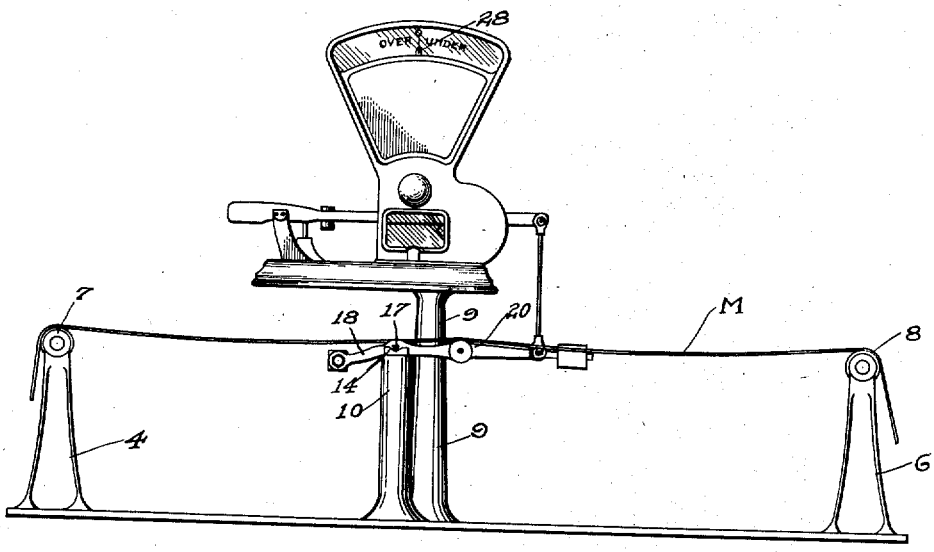
FIG. II.
INVENTOR.
EDWARD G THOMAS.
BY C O Marshall
ATTORNEY E. G. THOMAS
April 12, 1932.
TESTING DEVICE
Re. 18,421
Original Filed April 28, 1921 2 Sheets-Sheet 2
Fig. III.
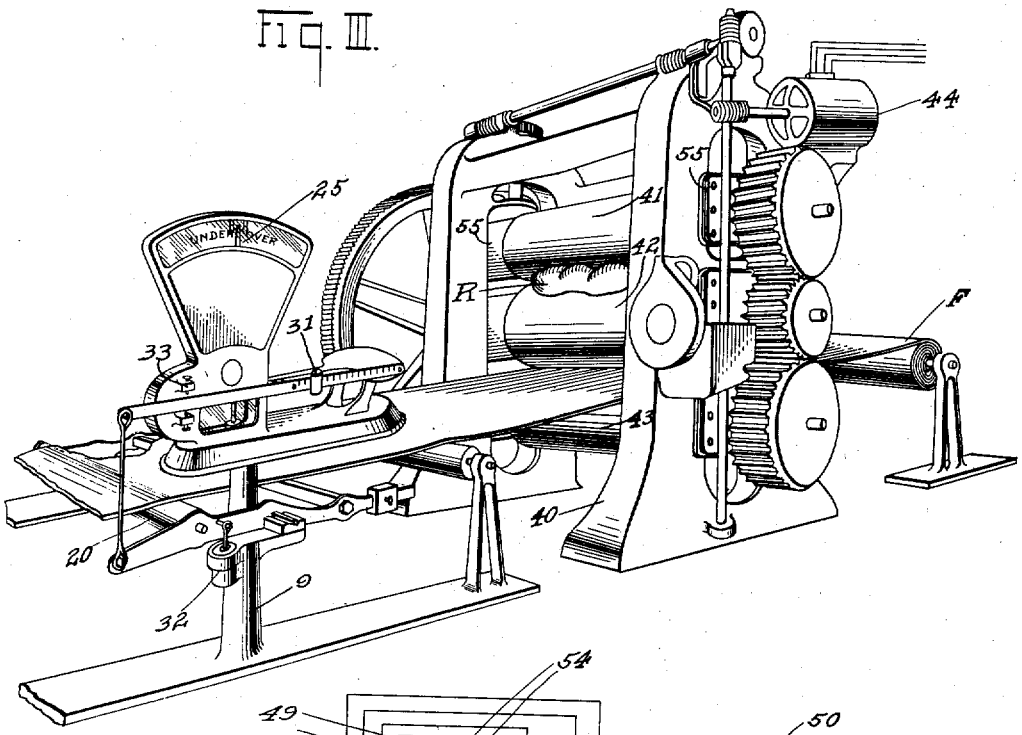
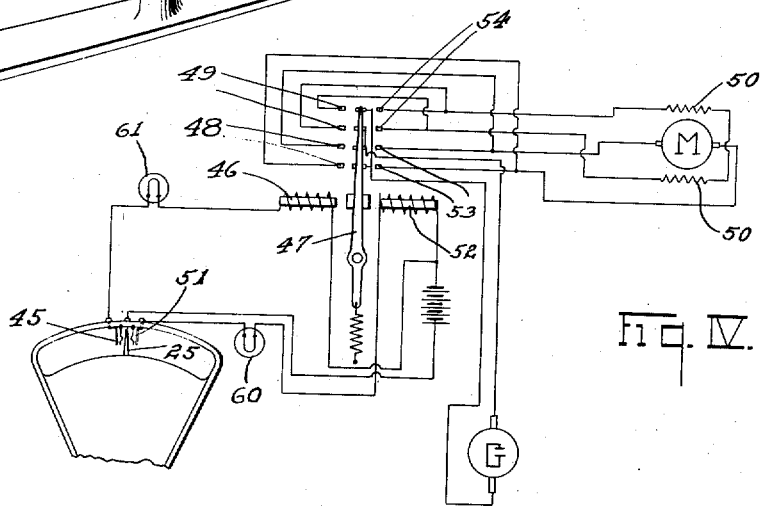
Fig. IV.
INVENTOR.
EDWARD G. THOMAS.
BY B. O. Marshall
ATTORNEY Reissued Apr. 12, 1932

Re. 18,421

UNITED STATES PATENT OFFICE

EDWARD G. THOMAS, OF TOLEDO, OHIO, ASSIGNOR TO TOLEDO SCALE MANUFACTURING COMPANY, OF TOLEDO, OHIO, A CORPORATION OF NEW JERSEY

TESTING DEVICE

Original No. 1,685,789, dated October 2, 1928, Serial No. 465,134, filed April 28, 1921. Application for reissue filed February 3, 1930. Serial No. 425,705.

This invention relates to testing devices, and particularly to devices for testing the weight per unit of length of a strip of fabric or other material. It is desirable that coated fabrics and similar products be of uniform weight, and calendering means are commonly provided with means whereby the weight of the coating may be increased or decreased. It is very difficult, however, to detect small variations in the weight of coating until a considerable quantity of the material has been coated and is available for weighing, and failure to detect and correct such variations often results in considerable losses.

The principal object of my invention is to provide a device by means of which variations in the weight of a product may be detected as it passes from the machine.

Another object is to provide automatic means for indicating such variations.

Still another object is to provide means for controlling the machine by which the product is made or supplied.

Other objects and advantages will be apparent from the following description, in which reference is had to the accompanying drawings illustrating preferred embodiments of my invention and wherein similar reference numerals designate similar parts throughout the several views.

In the drawings:—

Figure I is an isometric view of one form of a device embodying some of the features of my invention;

Figure II is a rear elevation thereof;

Figure III is a perspective view of a part of the device embodying further features of my invention; and Figure IV is a diagrammatic view of a system of wiring which may be employed in connection with the device shown in Figure III.

Referring to the drawings in detail and particularly to Figures I and II, the frame of the apparatus is shown as consisting principally of base members 1 and 2 and a plurality of uprights which support the working parts of the device. This particular form of frame is shown by way of example only.

Supported by the uprights 3, 4, 5 and 6 at the ends of the base members 1 and 2 are parallel rollers 7 and 8 over which the fabric or other material may be passed, as shown in the drawings. Other uprights 9 and 10 rise from the central portions of the base members 1 and 2, and projecting from the upright 9 is a fulcrum bracket 11 carrying a grooved bearing 13, while a grooved bearing 14 is supported upon the upper end of the upright 10.

The bearing 13 rockably supports the knife edge pivot 15 of a lever 16, while the bearing 14 rockably supports the knife edge pivot 17 of a lever 18. The levers 16 and 18 are rigidly connected by means of a bar which lies considerably below a plane tangent to the upper surfaces of the rollers 7 and 8. A third roller 20 is supported by the levers 16 and 18 so that it may move from a position with its upper surface above the plane tangent to the upper surfaces of the rollers 8 and 9 to a position with its upper surface below such plane.

Supported upon the upper end of the standard 9 is a weighing and indicating device, which I have illustrated as of the automatic pendulum weighing scale type.

The base 21 of the weighing scale supports a lever 22, the nose of which extends into a housing 23 and is connected to a pendulum 24 in the manner well known in the art. An indicating hand 25 is fixed to the pendulum and swings in the upper fan-shaped part 26 of the housing 23. The fan-shaped part of the housing contains a suitable chart 27 which co-operates with the hand 25, both the chart and the hand being visible through a window in the housing. The chart is preferably of the predetermined weight type, a single point being marked and the words "Under" and "Over" respectively being placed at the left and right side of the predetermined point. The scale may, if desired, be provided with a duplicate indicating device 28 which is visible from the other side of the housing. When the nose of the lever is depressed the pendulum swings upwardly, offering increasing resistance to the force depressing the nose of the lever, and the hand at the same time swings across the chart.

The weighing scale so far described is not per se of my invention and is not per se claimed herein, and the substitution of other types of weighing scales for the type illustrated is within the scope of the present invention. I have, therefore, illustrated and described the type shown with such particularity only as will suffice for a clear understanding of its relation to the other elements of my invention.

Rigidly connected to the main lever 22 of the scale (in a position corresponding to that occupied by the tare beam of a scale for ordinary weighing) is a beam 29, the left end of which extends considerably beyond the nose of the lever. This end of the beam 29 is connected to the end of the lever 16 by means of a link 30, the parts being so arranged and adjusted that when the lever 16 is sufficiently depressed to bring the upper side of the roller 20 into tangency with the plane which is tangent to the upper surfaces of the rollers 7 and 8 the indicator 25 will register with the predetermined mark.

The beam 29 carries a poise 31 which, when there is a load on the roller 20, may be moved to a position to balance the scale with the roller 20 in tangency with the plane tangent to the rollers 7 and 8 and the indicator hand in registration with the predetermined point on the chart.

The action of the device is steadied by means of a dash pot 32, and movement of the lever mechanism is limited by means of stops 33.

If a strip of fabric be laid upon the rollers and the poise 31 be moved to a position to bring the hand 25 into registration with a predetermined point, the rollers 7, 20 and 8 will be tangent to the same plane. Approximately half of the strip between the rollers 7 and 8 will be supported by the roller 20 and the proportion of this part of the strip carried by the roller 20 will not be appreciably changed by increasing or decreasing the tautness of the strip. If the weight of the strip be uniform the load on the roller 20 will be increased only when the tension on the strip is reduced sufficiently to allow the sag between the rollers to lengthen the part of the strip supported by them and the load will be decreased only when the tension is increased sufficiently to shorten the part of the strip between the rollers 7 and 8. In practice the tension on the fabric is very great as compared with the weight of the fabric, so that the strip is always taut, and no appreciable change in load results from small changes in tension.

Since the roller 20 is neither above nor below the rollers 7 and 8, increasing the tension tends neither to lift the strip from the roller 20 nor to force the roller downwardly, so that the load on the roller is merely the weight of that portion of the fabric supported thereby.

Since the roller 20 supports half the portion of the strip between the rollers 7 and 8, it is evident that any increase in the weight of that part of the strip will depress the roller and any decrease will allow it to swing upwardly. Either movement of the roller will cause the hand 25 to swing away from the central point on the chart and thus indicate the change in weight.

By passing a strip of material over the rollers as it comes from a calendering or other machine any change in the weight of the strip per unit of length may be at once detected and the necessary adjustments to bring the product back to its original weight may be promptly made.

In Figures III and IV I have shown a further development of my invention whereby the adjustment of the machine supplying the strip of material may be controlled automatically. The mechanism so far described is also employed in this development of the invention, being placed as before in position to test the weight of the material as it comes from the machine by which it is supplied (in this example shown as a calendering machine which consists essentially of a frame 40 supporting a series of adjustable rollers 41, 42, 43). When a machine of the type illustrated is employed for applying rubber to fabric, the rubber may be formed into a sheet by passing it between the upper rollers 41 and 42, the rubber from the mass R and fabric from the roll F thence passing together between the rollers 42 and 43, whereby the rubber is forced into the fabric. The thickness and hence the weight of the sheet of rubber is determined by the spacing of the rollers 41 and 42. For the purpose of automatically regulating the spacing of the rollers 41 and 42 I have provided a reversible motor 44 controlled by switches which are operated by movement of the indicating hand 25 from the central position.

The system of control may best be explained by reference to Figure IV, from which it will be seen that movement of the indicator hand to the left closes the switch 45 and energizes the magnet 46, thereby swinging the arm 47 to the left and closing the contacts 48 and the contacts 49 and causing the current to flow from the generator G through the motor armature M and through the field in one direction. Movement of the hand 25 to the right closes the switch 51 and energizes the magnet 52, thereby swinging the arm 47 to the right and closing the contacts 53 and the contacts 54 and causing the current to flow through the motor armature and through the field in the opposite direction.

From the foregoing it will be apparent that so long as the weight of the coated fabric and therefore the load on the roller 20 remains uniform, the motor 44 will remain at rest, but if the fabric "runs light" and the hand 25 swings to the left the motor will be actuated and the armature will be turned in one direction, and if the fabric "runs heavy" the motor will be actuated with the polarity of the field reversed and the armature will be turned in the opposite direction.

The upper roller 41 is supported by cross heads 55 slidably mounted in the frame 40 of the coating machine and movable by means of worm gearing connected to the motor 44 and so arranged that when the fabric "runs light" the upper roller 41 is raised and the space between the rollers 41 and 42 is increased, and when the fabric "runs heavy" the space between the rollers 41 and 42 is decreased. The substantial uniformity of the product is thus insured.

In cases in which it is desired that the indication be visible from a distance a red lamp 60 may be interposed in the circuit, which is closed when the hand 25 is swung to the right by reason of an increase in weight per unit of area of the material, and a green light 61 may be interposed in the circuit, which is closed when the hand 25 swings to the left by reason of the decrease in the weight per unit of area of the material, and circuits containing lamps of different colors may, of course, be employed in cases in which the automatic control mechanism is not used.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a device of the class described, in combination, a pair of supports for a strip of material, and a predetermined weight weighing device adapted to be adjusted to support a portion of such strip in the same plane as the portions engaging said pair of supports, whereby changes in the weight of said strip may be detected by said predetermined weighing device regardless of the condition of tautness of said strip.

2. In a device of the class described, in combination, a pair of supports, the upper surfaces of which lie in substantially the same plane, a support lying between the first said supports and movable from a position with its upper surface above the plane of the upper surfaces of the first said supports to a position with its upper surface below such plane, manually adjustable means for counterbalancing a portion of the load on said movable support, automatic means for balancing the remainder of such load, and means for indicating whether the upper surface of said movable support is in the plane of the upper surfaces of the first said supports or above or below said plane.

3. In a device of the class described, in combination, a pair of supports, the upper surfaces of which lie in substantially the same plane, a roller between the said supports, said roller being movable from a position with its upper surface above the plane of the upper surfaces of said supports to a position with its upper surface below such plane, manually adjustable means for counterbalancing a portion of the load on said roller, automatic means for balancing the remainder of such load, and means to determine whether the upper surface of said roller is in the plane of the upper surfaces of the said supports or above or below such plane.

4. In a device of the class described, in combination, a pair of supports, the upper surfaces of which lie in substantially the same plane, a roller between the said supports, said roller being movable from a position with its upper surface above the plane of the upper surfaces of the said supports to a position with its upper surface below such plane, and weighing means connected to said roller.

5. In a device of the class described, a pair of rollers journaled in an immovable frame, the upper surfaces of said rollers lying in substantially the same plane, a roller lying between the first said rollers and so supported as to be movable from a position with its upper surface above the plane of the upper surfaces of the first said rollers to a position with its upper surface below such plane, manually adjustable means for counterbalancing a portion of the load upon said movably-mounted roller, automatic means for counterbalancing the remainder of such load, and means for indicating whether the upper surface of said movably-mounted roller is in the plane of the upper surfaces of the first said rollers or above or below such plane.

6. A device for detecting variations in the weight per unit of length of a moving strip of material comprising, in combination, a pair of supports with their upper surfaces in substantially the same plane, a single movable support between the first said supports, means for so counterbalancing the weight of a portion of a strip of fabric supported by the movable support that the upper surfaces of all of said supports lie in the same plane, and means for indicating movement of the movable support.

7. A device for detecting variations in the weight per unit of length of a moving strip of material comprising, in combination, a pair of supports with their upper surfaces in substantially the same plane, a movably-mounted roller lying between said supports, means for so counterbalancing the weight of the portion of the strip of fabric supported by said movably-mounted roller that the upper surface of said roller lies in the plane of the upper surfaces of said supports, and means for indicating bodily movement of said roller.

8. A device for detecting variations in the weight per unit of length of a moving strip of material comprising, in combination, a pair of rotatable rollers journaled in a fixed frame with their upper surfaces in substantially the same plane, a single movably-supported roller lying between the first said rollers, means for so counterbalancing the weight of the portion of a strip of fabric supported by said movably-supported roller that the upper surfaces of said rollers lie in the same plane, and means for indicating the movement of said movably-mounted roller.

9. A device for detecting variations in the weight per unit of length of a moving strip of material comprising, in combination, a pair of supports with their upper surfaces in substantially the same plane, a single movable support between the first said supports, means for so counterbalancing the weight of a portion of a strip of fabric supported by the movable support that the upper surfaces of all of said supports lie in the same plane, an electric circuit adapted to be closed by upward movement of said movable support, and an electric circuit adapted to be closed by downward movement of said movable support.

10. In a device of the class described, in combination, a pair of supports, the upper surfaces of which lie in substantially the same plane, a support lying between the first said supports and movable from a position with its upper surface above the plane of the upper surfaces of the first said supports to a position with its upper surface below such plane, manually-adjustable means for counterbalancing a portion of the load on said movable support, automatic means for balancing the remainder of such load, and electric circuits adapted to be selectively closed upon movement of said movable support above or below said plane.

11. The process described herein of weighing sheet material during its manufacture to check any variation in thickness, said process consisting in passing a web of material over two points spaced apart so as to suspend a section of the material between the points, allowing the suspended portion of the material to come in contact with a device which will indicate the differences in weight so that the mechanism can be adjusted to produce a sheet of material of substantially an even thickness throughout.

12. In a machine of the class described, a pivotally mounted frame for supporting a predetermined portion of a web, means for causing the web to travel continuously over said frame, means for balancing said frame when a web of given weight per unit of length is passing thereover, and means for indicating the weight per unit of length of the web on said frame.

13. In a machine of the class described, a movably mounted frame for supporting a predetermined portion of a web, means for causing the web to travel continuously over said frame, means for balancing said frame, and means for indicating the weight per unit length of said web.

14. In a machine of the class described, a movably mounted frame for supporting a predetermined portion of a web, means for causing the web to travel continuously over said frame, means for balancing said frame, and means for indicating the variations in weight per unit length of said web.

Whittier, Los Angeles County, California, January 25, 1930.

EDWARD G. THOMAS.